May 27, 1930.  C. H. REHFUS-OBERLÄNDER  1,760,517
FELTING AND FULLING MACHINE
Filed Aug. 22, 1928
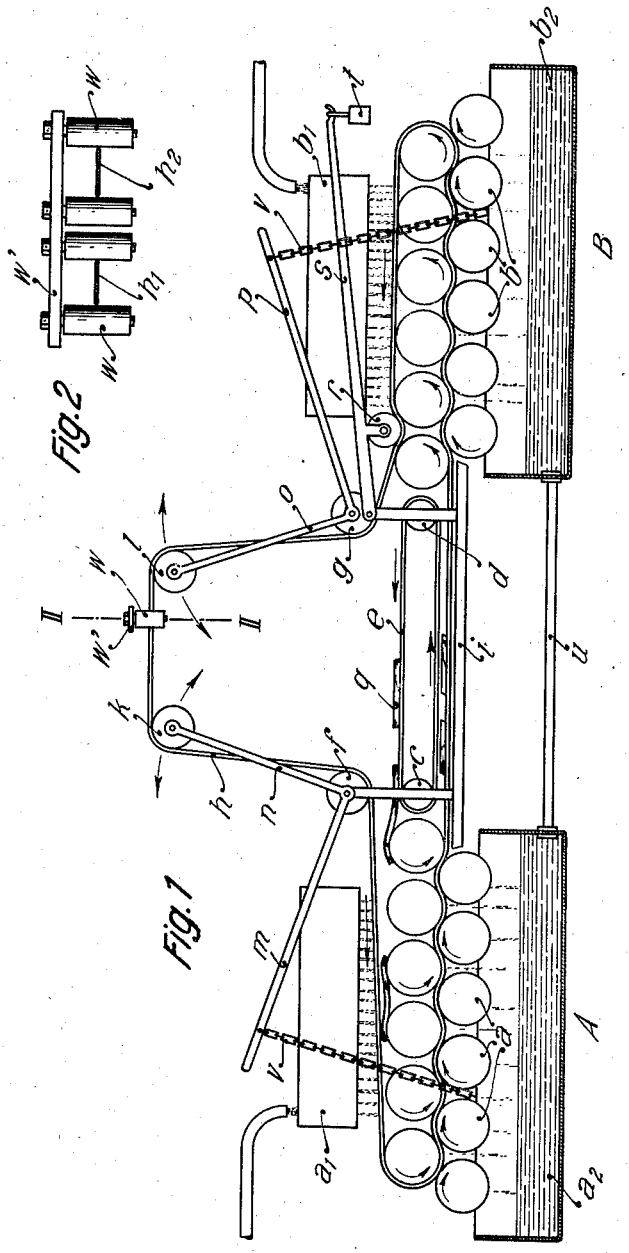
C. H. Rehfus-Oberländer
INVENTOR
By Marks & Clerk Attys.

Patented May 27, 1930

1,760,517

UNITED STATES PATENT OFFICE

CARL HANS REHFUS-OBERLÄNDER, OF KEHL-ON-THE-RHINE, GERMANY

FELTING AND FULLING MACHINE

Application filed August 22, 1928, Serial No. 301,343, and in Germany June 23, 1927.

My invention relates to felting and fulling machines and particularly, though not exclusively, to machines for felting and fulling hats, and it is an object of my invention to provide a machine of this type in which the amount of handling required is a minimum.

To this end I provide two sets of rollers, principal conveying means intermediate the sets, and auxiliary conveying means moving through and above the rollers of each set which means cooperate so as to move the articles from one set to the other, and through each set, without handling and as often as required.

In machines of this type as heretofore designed the articles were transferred manually from one set of rollers to the other. They were supplied to one of the sets at a given point, travelled through the set, and were ejected at another point. If it was necessary to return the articles to the set after they had been ejected, or to transfer them to another set, this could only be effected by handling them. As a rule, in the treatment of hats and the like, it is inevitable that the articles should be treated repeatedly, and therefore the amount of handling is very considerable until the treatment is completed. Articles are supplied to the machine in rapid succession and so it will be understood that this method entails considerable labour and the cost of manufacture is high in proportion.

This drawback is overcome in my invention in which an article is moved from one set to the other, and back, infinitely without any handling.

In a machine designed on the lines of my invention, I may provide two sets of rollers, a principal conveyer intermediate the sets for receiving the articles and for moving them from one set to the other, and an auxiliary conveyer which extends through and above the sets and cooperates with the principal conveyer. The conveyers may be endless bands of the usual type and carried on rollers. If desired the auxiliary conveyer may be subdivided into two separate units and means may be provided for varying the pitch of the units.

Preferably, means may also be provided for varying the tension of the auxiliary conveyer and for adapting the machine to articles of various thickness.

In the accompanying drawing a machine embodying my invention is illustrated diagrammatically by way of example.

Fig. 1 is an elevation of the machine,

Fig. 2 is a partial elevation and partial section on the line II—II in Fig. 1, drawn to a larger scale.

Referring now to the drawing, A and B are sets of rollers $a$ and $b$ each comprising two superimposed rows of rollers which rotate as indicated by the arrows, $a'$ and $b'$ are hot water sprinkling tanks above each set, $a^2$, $b^2$ are collectors, and $u$ is a pipe connecting them. $e$ is the principal conveyer which is moving on rollers $c$ and $d$ intermediate the sets of rollers. Its width is equal to the width of the rollers, its upper reach is at the level of the roller tops in the two sets, and its speed is equal to the—identical—circumferential speeds of the rollers $a$ and $b$. The upper reach of the principal conveyer $e$ travels from the set B to the set A, and motion is imparted to the conveyer by means connected with one of its rollers $c$ or $d$, or both.

$h$ is the auxiliary conveyer which in its lower reach travels between the rollers of the sets A and B and below the lower reach of the principal conveyer $e$. Preferably the auxiliary conveyer is of sail cloth impregnated with rubber, and it may be subdivided into two units $h'$, $h^2$, as shown in Fig. 2, for large articles. $g$ and $f$ are guiding rollers for the upper reach of the auxiliary conveyer $h$, $m$, $n$ and $o$, $p$ are bell crank levers, $k$ and $l$ are guiding rollers at the upper ends of the levers on which the upper reach of the auxiliary conveyer $h$, or the conveyers $h'$, $h^2$, is carried, and $i$ is a table intermediate the sets of rollers A, B below the lower reach of the auxiliary conveyer.

As will appear the auxiliary conveyer $h$ travels from the fixed roller $f$ past the rollers $a$ at the top, is reversed at the end of the set A, moves on between the rollers $a$, past the table $i$, between the rollers $b$ of the other set B, is again reversed at the end of the set, moves past the tops of its rollers to the roller $g$ which is also fixed, rises to the rollers $k$ and $l$ and finally returns to the fixed roller $f$.

Tension may be imparted to the auxiliary conveyer $h$ by rocking the bell crank levers on their pivots on the rollers $f$ and $g$ for which purpose chains $v$ may be secured to the free arms of the bell crank levers. By means of these chains the rollers $k$, $l$ are rocked as indicated by the arrows to slacken or tighten the conveyer $h$.

When the auxiliary conveyer is subdivided into two units $h'$, $h^2$ as shown in Fig. 2, means may be provided for displacing or tilting the bell crank levers $m$, $n$ and $o$, $p$ so as to vary the pitch of the units laterally if articles of different sizes are treated. $w$, $w$ are vertical guiding rollers which are secured in a bracket $w'$ and may be adjusted therein to suit the pitch of the units. The rollers $w$, $w$ may be arranged intermediate the rollers $k$, $l$, as shown in Fig. 1, or in any other suitable position. Subdividing the auxiliary conveyer into two units has the further advantage that the access of liquid from the tanks $a'$, $a^2$ to the articles is facilitated.

Preferably the articles are squeezed before being delivered to the upper reach of the principal conveyer $e$ from the set B so that they will not be too wet when arriving at this point. $r$ is a squeezing roller arranged between and above the two last rollers $b$ in the upper row of the set B, $s$ is a lever on which the roller $r$ is carried and which is fulcrumed on the frame of the machine, not shown, and $t$ is a weight at the end of the lever. Obviously, such rollers may be arranged at any other point, if desired.

The operation of the machine is as follows:

The articles $q$, for instance, felt hats, are placed on the upper reach of the conveyer $e$ by the attendant and entrained toward the set A in the direction of the arrow. After the articles have been engaged by the rollers $a$, they are moved on along the roller tops, engaged by the upper reach of the auxiliary conveyer $h$, carried through its rollers, delivered to the lower reach of the principal conveyer $e$ above the table $i$, being held by the lower reach of the auxiliary conveyer $h$, and transferred to the set B in which they move through the rollers $b$, are reversed at the end of the set, and returned to the conveyer $e$ by the last roller $b$. The cycle is now restarted and this treatment is repeated as often as required until the articles are finished, whereupon the attendant takes them from the upper reach of $e$ and places them aside. The articles may also be rearranged on a table and returned to the machine for finishing. The tension of the auxiliary conveyer $h$ is regulated by the chains $v$ as required to make up for variations in the size of the articles.

The auxiliary conveyer $h$ need not be equipped with a driving mechanism of its own as it will move with the rollers of the sets A, B which may be driven by any suitable means, not shown.

My machine requires only one, or at most two attendants but its output is superior to, or at least equal, to that of a machine of the old type of equal size but requiring many more attendants for handling the articles. Apart from this, the efficiency of the machine is improved as it is possible to sprinkle the articles continuously and consequently to apply much hotter liquid to them.

It will be understood that the machine illustrated by way of example may be modified in various ways without departing from the gist of my invention which is the connection of two sets of rollers by a conveyer.

I claim:

1. A device for felting and fulling felt hats, including two roller tracks formed of superposed rows of rollers, the roller tracks being connected together by conveying means which convey the felt hats from between the rows of rollers of one roller track to between the rows of rollers of the other roller track and then lead the felt hats from the roller tracks of the latter to those of the former again so that the felt hats automatically describe a cycle which is repeated frequently without interruption, said conveying means including an endless conveyor belt consisting of two rubber belts extending from the inlet between the two roller sets of one roller track over a table between both roller tracks and between the two roller sets of the other roller track, then above the upper roller set of the last mentioned roller track over guide rollers and finally above the upper roller sets of the first mentioned roller track and into its inlet.

2. A device for felting and fulling felt hats, including two roller tracks formed of superposed rows of rollers, the roller tracks being connected together by conveying means which convey the felt hats from between the rows of rollers of one roller track to between the rows of rollers of the other roller track and then lead the felt hats from the roller tracks of the latter to those of the former again so that the felt hats automatically describe a cycle which is repeated frequently without interruption, said conveying means including an endless conveyor belt consisting of two rubber belts extending from the inlet between the two roller sets of one roller track over a table between both roller tracks and between the two roller sets of the other roller track, then above the upper roller set of the last mentioned roller track over lower and upper guide rollers and finally above the upper roller set of the first mentioned roller track and into its inlet, the lower guide rollers being secured to the machine frame and the upper guide rollers being secured to one end of bell crank levers rotatably mounted on the machine frame so that the distance of the two upper rollers from each other may be varied by raising or lowering the free members of the said bell crank levers.

3. A device for felting and fulling felt hats, including two roller tracks formed of superposed rows of rollers, the roller tracks being connected together by conveying means which convey the felt hats from between the rows of rollers of one roller track to between the rows of rollers of the other roller track and then lead the felt hats from the roller tracks of the latter to those of the former again so that the felt hats automatically describe a cycle which is repeated frequently without interruption, said conveying means including an endless conveyor belt consisting of two rubber belts extending from the inlet between the two roller sets of one roller track over a table between both roller tracks and between the two roller sets of the other roller track, then above the upper roller set of the last mentioned roller track over upper and lower guide rollers and finally above the upper roller sets of the first mentioned roller track and into the inlet, the lower guide rollers being secured to the machine frame and the upper guide rollers being secured to one end of bell crank levers rotatably mounted on the machine frame so that the distance of the two upper rollers from each other may be varied by raising or lowering the free members of the said bell crank levers, the position of the rotary axes of the upper guide rollers being variable by a lateral displacement of the bell crank levers.

4. A device for felting and fulling felt hats, including two roller tracks formed of superposed rows of rollers, the roller tracks being connected together by conveying means which convey the felt hats from between the rows of rollers of one roller track to between the rows of rollers of the other roller track and then lead the felt hats from the roller tracks of the latter to those of the former again so that the felt hats automatically describe a cycle which is repeated frequently without interruption, said conveying means including an endless conveyor belt consisting of two rubber belts extending from the inlet between the two roller sets of one roller track over a table between both roller tracks and between the two roller sets of the other roller track, then above the upper roller set of the last mentioned roller track over upper and lower guide rollers and finally above the upper roller sets of the first mentioned roller track and into the inlet, the lower guide rollers being secured to the machine frame and the upper guide rollers being secured to one end of bell crank levers rotatably mounted on the machine frame so that the distance of the two upper rollers from each other may be varied by raising or lowering the free members of the said bell crank levers, the position of the rotary axes of the upper guide rollers being variable by a lateral displacement of the bell crank levers, a squeezing roller being provided on a lever rotatably mounted on the machine frame for the purpose of squeezing the wet felt hats, which roller is constantly depressed by a weight on the lever between the two last fulling rollers, adjacent the conveyor belt, of the upper roller set of one of the two roller tracks.

In testimony whereof I have signed my name to this specification.

CARL HANS REHFUS-OBERLÄNDER.